April 26, 1932.   E. G. SCHAEFFER   1,855,992
JOINT
Filed July 3, 1931
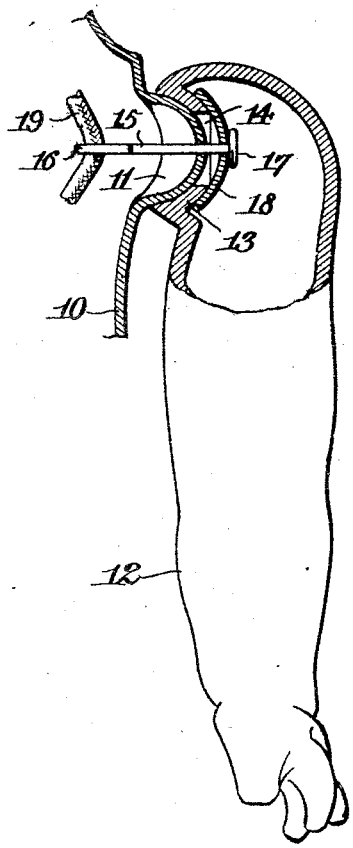
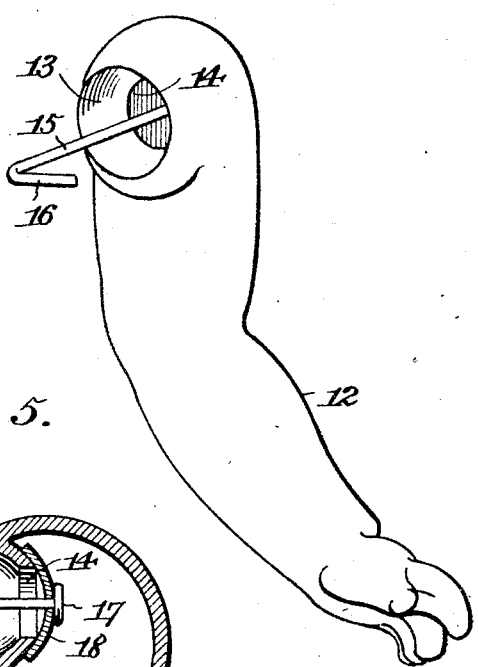
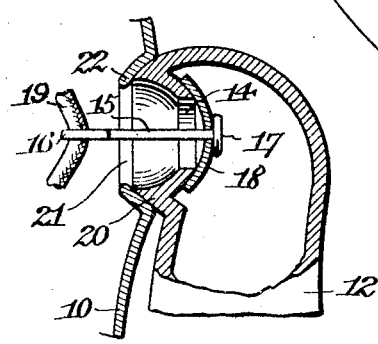
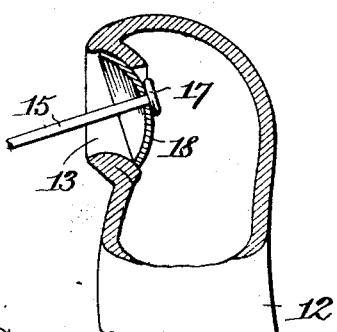
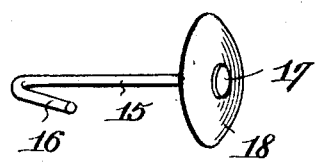
WITNESSES
Chris Feinle.
a. N. Martin.
INVENTOR
Edward G. Schaeffer.
BY Munn & Co.
ATTORNEYS.

Patented Apr. 26, 1932

1,855,992

UNITED STATES PATENT OFFICE

EDWARD G. SCHAEFFER, OF BROOKLYN, NEW YORK, ASSIGNOR TO AMERICAN CHARACTER DOLL CO., INC., OF NEW YORK, N. Y., A CORPORATION OF NEW YORK

JOINT

Application filed July 3, 1931. Serial No. 548,662.

This invention relates to a joint or articulation between two main members, allowing relative movement thereof, and which may be used advantageously to join parts of a doll or the like and for other similar purposes.

An object of the invention is the provision of a joint or articulation of such character that parts or members of dissimilar materials, such as metal and rubber or the like, may be joined or connected for relative movement; and that a hollow part or member of rubber or like material may be joined to another part or member by concealed fastening or securing means enabling movement of the hollow part or member.

The invention also has for an object the provision of a joint or articulation of simple, inexpensive and efficient construction.

The nature of the invention and its distinguishing features and advantages will appear when the following specification is read in connection with the accompanying drawings, in which Figure 1 is a view partly in section and partly in elevation of a part of a body and an arm of a doll selected to illustrate the features of the invention;

Figure 2 is a perspective view of the arm shown in Figure 1 and the fastening or securing means associated therewith;

Figure 3 is a section illustrating the manner in which the fastening or securing means is brought into engagement with the socket of the arm;

Figure 4 is a perspective view of the fastening or securing means;

Figure 5 is a view similar to Figure 1, but showing a modification of the invention.

Referring now more particularly to the drawings, there has been shown, by way of example, a portion 10 of the body of a doll, the same being constructed of metal and having a convex boss 11. There is also shown an arm 12 of the doll, which is of hollow construction and which is made of soft, pliable or resilient material such as rubber or the like. The arm 12 has an integral socket 13 which is of such form as to receive the boss 11. The socket 13 is therefore of concavo-convex construction and has an opening 14. The boss 11 and socket 13 are articulated to allow relative or universal movement of the arm 12 in relation to the body portion 10, and these parts are maintained in this relationship by suitable fastening or securing means. In the present instance, a practical form of fastening or securing means consists of a member 15 having a hook or the like 16 on one end and a head 17 on its opposite end and also a separate socket member 18 which is of concavo-convex construction to conform to the socket 13. The socket member 18 is arranged on the member 15 between the head 17 and the socket 13, and said member 15 extends through the opening 14 in the socket and also through a hole in the boss 11. The hook or the like 16 is engaged with an elastic element 19, commonly used to cooperate with fastening or securing means of the form described to complete the joint or articulation of the parts.

Attention is called to the fact that the socket member 18 is larger in diameter than the diameter of the opening 14. Due to the fact that the arm 12 and its integral socket 13 are formed of pliable or elastic material such as rubber, it is possible to force the socket member 18 through the opening 14 of the socket 13; it being obvious that the socket 13 will stretch in order that it will be possible to bring the socket member 18 inside of the arm 12. After this has been done the socket 13 assumes its normal formation as shown in Figure 1. The securing member 15 may then be extended through the boss 11 of the body portion 10 enabling the boss 11 to be received in the socket 13. By engaging the hook 16 with the elastic element 19, the parts will be properly assembled.

Another way of accomplishing the same result as described hereinabove and illustrated is to fit the projecting portion or boss 20 of the arm 12 in an opening 21 in the body portion 10, as shown in Figure 5, in lieu of the boss 11 as shown in Figure 1. In the construction shown in Figure 5, the material of the body portion 10 may be directed inwardly to form a seat 22 for the boss 20 if the material is relatively thin as shown. In other respects, the form of the invention shown in Figure 5 is similar to that shown in Figure 1 and similar reference numerals are used to designate similar parts.

Claims:

1. A joint between two main parts, one of said parts being of hollow construction and having a single opening therein, a socket surrounding said opening inwardly of said hollow member, a boss on the other of said parts fitting in said socket, and securing means retaining said boss in said socket in such manner that said parts may have movement in relation to each other, and said means including a socket member having the shape of said socket, said socket member being larger in diameter than the diameter of the opening, said socket member being arranged inside of said hollow part in contact with the socket, said socket being constructed of elastic material to allow the socket member to be forced through the opening in position inside of said hollow part.

2. A joint between two main parts of a doll, one of said parts being of hollow construction and having an opening therein surrounded by a concavo-convex section, and securing means connecting said parts together, said means including a member having the shape of said section, said member being larger in diameter than the diameter of the opening, said member being arranged inside of said hollow part in contact with said section, said section being constructed of elastic material to allow said member to be forced through the opening in position inside of said hollow part.

EDWARD G. SCHAEFFER.